United States Patent Office.

ELIZA D. MURFEY, OF NEW YORK, N. Y.

Letters Patent No. 108,285, dated October 11, 1870.

IMPROVEMENT IN SATURATING FIBROUS MATERIALS WITH POWDERED SUBSTANCES, FOR BEARINGS AND PACKING.

The Schedule referred to in these Letters Patent and making part of the same

I, ELIZA D. MURFEY, of New York, county of New York, State of New York, have invented a Process of Combining Powdered and Fibrous Materials in the Manufacture of Bearings, Packings, &c., of which the following is a specification.

Nature and Object of the Invention.

My invention consists of a process, too fully described hereafter to need preliminary explanation, whereby comminuted insoluble substances and loose fibers may be thoroughly combined.

Fibrous material, as wool, hemp, hair, or cotton, or a mixture of such materials, is placed in a mass and slightly compressed upon a perforated partition, arranged a short distance above the bottom of a suitable vessel, the chamber beneath the said partition communicating with a suction-pump, or other exhausting apparatus.

The insoluble substance, such as plumbago, asbestos, &c., which is to be combined with the fibers, is first comminuted, and afterward thoroughly mixed with melted paraffine, tallow, or equivalent material.

The mixture is then poured into the vessel, upon the mass of fibers, and the air is exhausted from beneath the partition, so as to force the mixture through the fibers.

As the mixture passes through the mass of fibers it is filtered by the latter, so that the paraffine, or other vehicle for carrying the insoluble substance, passes into the chamber below the partition in a comparatively pure state, while the greater part of the said substance is lodged among the fibers.

After the mass of fibers has become thoroughly impregnated with the insoluble substance it is withdrawn from the vessel, and subjected to pressure between heated plates, which remove nearly all the remaining portion of paraffine, or equivalent material, and reduce the mass to the form of a sheet, in which fibrous and insoluble substances are thoroughly and uniformly combined.

The sheet of material thus produced may be employed as a substitute for leather or rubber, in packing-joints, &c., or in stuffing-boxes as a packing for pistons, &c; or it may be cut into blocks or strips, and molded, under excessive pressure, to produce hard packings or bearings.

Instead of passing the composition through a mass of fibers, as described, the whole may be mixed together, and then strained or compressed, so as to remove the excess of paraffine, or other material used as a vehicle, the comparatively dry mass being then compressed into sheets between heated plates, so as to extract nearly all the remaining portion of the vehicle remaining in the mass.

By the use of paraffine, or equivalent substances, as a vehicle for carrying the comminuted materials among the mass of fibers, the latter are more thoroughly impregnated than is possible by the ordinary processes, while the subsequent application of heat and pressure removes a large amount of paraffine, the presence of which would impair the efficiency of the packing.

Claim.

The within-described process of impregnating a mass of fibers with insoluble substances, that is to say, saturating the mass with melted paraffine, or equivalent material, holding the powdered substance in suspension, and then removing the paraffine by heat or pressure, or both.

In testimony whereof, I have signed my name to this specification in the presence of two subscribing witnesses.

E. D. MURFEY.

Witnesses:
THOMAS PRUDEN,
HENRY McMANUS.